United States Patent [19]

Carr

[11] Patent Number: 5,193,653

[45] Date of Patent: * Mar. 16, 1993

[54] MECHANICALLY ACTUATED BRAKE WITH AUTOMATIC ADJUSTMENT

[75] Inventor: Clyde E. Carr, Galien, Mich.

[73] Assignee: Allied-Signal Inc., Morristown, N.J.

[ * ] Notice: The portion of the term of this patent subsequent to Feb. 4, 2009 has been disclaimed.

[21] Appl. No.: 750,344

[22] Filed: Aug. 27, 1991

Related U.S. Application Data

[63] Continuation-in-part of Ser. No. 572,195, Aug. 23, 1990, Pat. No. 5,085,296.

[51] Int. Cl.$^5$ ............................................. F16D 51/50
[52] U.S. Cl. ............................ 188/79.55; 188/79.62; 188/196 BA
[58] Field of Search ............... 188/79.51, 79.53, 79.55, 188/79.61–79.64, 196 BA, 200, 106 A, 106 F, 327, 331

[56] References Cited

U.S. PATENT DOCUMENTS

| | | | |
|---|---|---|---|
| 3,199,640 | 8/1965 | Thompson | 188/196 BA |
| 3,209,766 | 10/1965 | Ullrich | 188/79.62 |
| 3,265,161 | 8/1966 | Croissant et al. | 188/79.62 |
| 3,323,618 | 6/1967 | Riddy | 188/106 F X |
| 3,361,232 | 1/1968 | Engle | 188/196 BA |
| 3,581,847 | 6/1971 | Torii et al. | 188/79.54 |
| 3,583,532 | 6/1971 | Hodkinson | 188/79.55 |
| 4,079,819 | 3/1978 | Shirai et al. | 188/327 |
| 4,401,195 | 8/1983 | Last | 188/79.54 |
| 4,480,726 | 11/1984 | Idesawa | 188/79.55 |
| 4,494,633 | 1/1985 | Idesawa | 188/329 |
| 4,503,949 | 3/1985 | Corré et al. | 188/79.64 |
| 4,645,040 | 2/1987 | Knott et al. | 188/79.63 |
| 4,702,357 | 10/1987 | Rozmus | 188/79.56 |
| 4,844,212 | 7/1989 | Rodino et al. | 188/79.56 |
| 4,907,929 | 3/1990 | Johnston, Jr. | 411/431 |
| 5,085,296 | 2/1992 | Carr et al. | 188/79.55 |

FOREIGN PATENT DOCUMENTS

| | | | |
|---|---|---|---|
| 337320 | 10/1989 | European Pat. Off. | 188/79.51 |
| 2718031 | 10/1978 | Fed. Rep. of Germany | 188/79.63 |
| 2722107 | 1/1979 | Fed. Rep. of Germany | 188/79.63 |
| 2727033 | 1/1979 | Fed. Rep. of Germany | 188/79.63 |
| 3304593 | 8/1984 | Fed. Rep. of Germany | 188/79.61 |
| 1198362 | 7/1970 | United Kingdom | 188/79.55 |
| 1459872 | 12/1976 | United Kingdom | 188/79.63 |
| 2090635 | 7/1982 | United Kingdom | 188/79.55 |

*Primary Examiner*—Robert J. Oberleitner
*Assistant Examiner*—Alfred Maratori
*Attorney, Agent, or Firm*—Larry J. Palguta; Ken C. Decker

[57] ABSTRACT

The mechanically actuated brake (10) comprises a laterally movable sleeve housing (22) which is attached by slots (24) and connections (26) with the support plate (28). A mechanical actuator and adjuster mechanism (40) has parts (42, 48) received within a longitudinal through opening (27) of the housing (22), a first part (42) of the mechanism (40) abutting one brake shoe end (20) while a second part (48) of the mechanism (40) abuts the other brake shoe end (18). A lever (50) for service brake operation is attached pivotably by a connection pin (30) with the housing (22) and extends through a transverse through opening (29) of the housing (22). The lever (50) is received within a slot (49) of the second part (48) of the mechanism (40), and includes an actuating arm (57) which extends through the housing (22) and is engagable with an actuating arm (66) of a pawl (60) that actuates the adjuster portion of the mechanism (40). The pin connection (30) also mounts rotatably the pawl (60) to the housing (22). The pawl (60) includes a spring support flap (67) which receives one end of a spring (70) attached to the one brake shoe end (20). A return spring (80) extends between the connection (30) and another brake shoe end (18) in order to effect return of the associated brake shoe (12), to reduce the torque required to rotate a star wheel (44) of the mechanism (40), and to reduce the size of the spring (70) attached to the one brake shoe end (20).

10 Claims, 4 Drawing Sheets

MECHANICALLY ACTUATED BRAKE WITH AUTOMATIC ADJUSTMENT

This Application is a continuation-in-part of application Ser. No. 572,195, filed Aug. 23, 1990, now U.S. Pat. No. 5,085,296 entitled "MECHANICALLY ACTUAL BRAKE WITH AUTOMATIC ADJUSTMENT."

The present invention relates generally to a mechanically actuated brake with automatic adjustment, in particular a mechanically actuated brake having a laterally slidable housing which supports the actuating lever, star wheel adjuster, pawl, and a spring attached to the pawl.

BACKGROUND OF THE INVENTION

Mechanically actuated drum brakes having automatic adjustment devices typically require a large number of parts in order to provide the requisite functions. Such drum brakes require shoe hold down pins, springs and cups, an anchor plate with posts, automatic adjustment linkages, cables, and other devices. It is highly desirable to provide a mechanically actuated drum brake with automatic adjustment which has a reduced number of parts and, because it has been designed with a view toward assembly methods, comprises parts which may accomplish more than one function. Rodino et al U.S. Pat. No. 4,844,212 illustrates a prior mechanically actuated brake which reduced the number of parts. It is an object of the present invention to further improve the structure of such a mechanically actuated brake with automatic adjustment.

SUMMARY OF THE INVENTION

The present invention provides a mechanically actuated brake with automatic adjustment, comprising a support plate providing support for a pair of brake shoes disposed oppositely from one another, first and second pairs of brake shoe ends connected at the first pair of ends by spring means urging the first pair of brake shoe ends toward one another, a mechanical actuator and adjuster mechanism located between the second pair of brake shoe ends, the mechanism including an adjuster device comprising a laterally slidable housing having a longitudinal opening communicating with a transverse opening therethrough, an actuator lever extending to engage a part of the adjuster device by way of said transverse opening, the adjuster device having first, second and third parts, the first and second parts located within said longitudinal opening, the second part engaged by said lever and the third part comprising a pawl engageable by the lever, means for connecting rotatably the lever and pawl with said housing, said pawl extending to engage said first part, a spring extending between said pawl and one brake shoe end of the second pair of brake shoe ends, and a second spring extending between the connecting means and the other brake shoe end of said second pair of brake shoe ends.

BRIEF DESCRIPTION OF THE DRAWINGS

One way of carrying out the invention is described in detail below with reference to the drawings which illustrate an embodiment in which.

DETAILED DESCRIPTION OF THE INVENTION

Figure 1:
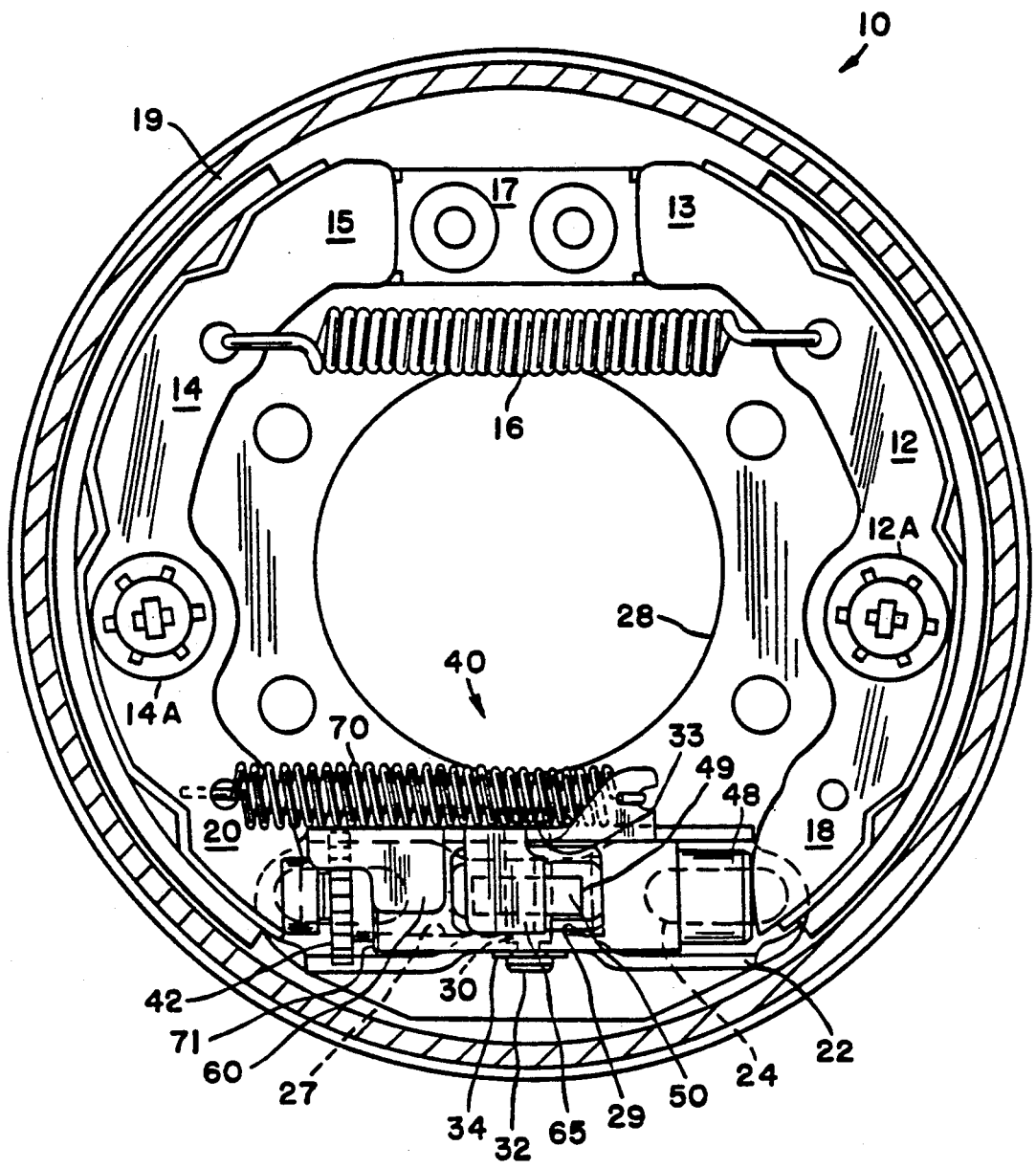
FIG. 1 is a plan view of the mechanically actuated brake of the present invention.
Figure 2:
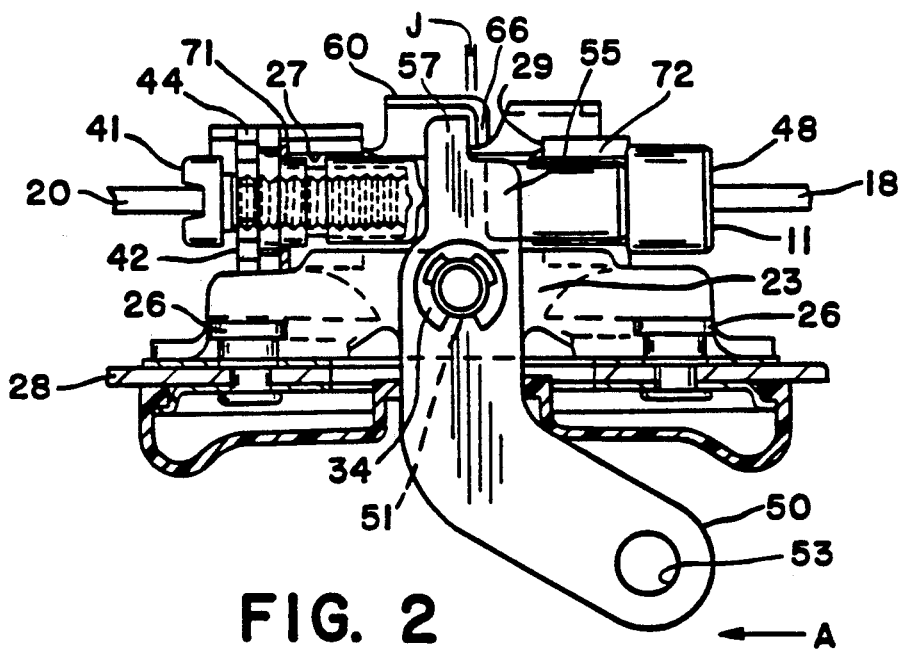
FIG. 2 is a section view taken along view line 2—2 of FIG. 1.
Figure 3:
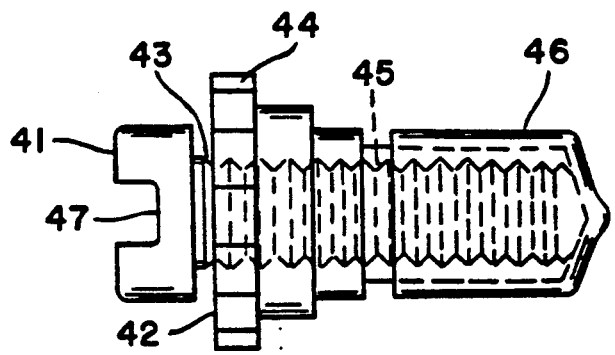
FIG. 3 is a view of the star wheel mechanism of the adjuster device of the present invention.
Figure 4:
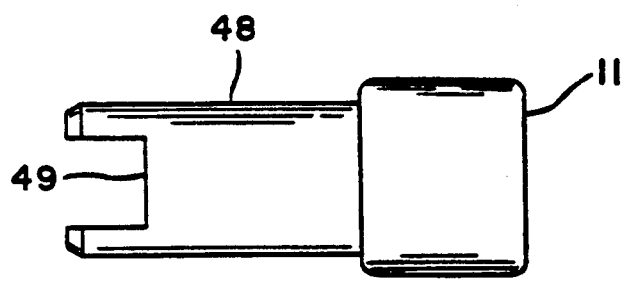
FIG. 4 is a view of a second part of the adjuster device.

The mechanically actuated brake is designated generally by reference numeral 10 in FIG. 1. Brake 10 comprises a pair of brake shoes 12 and 14 having opposing pairs of brake shoe ends 13 and 15 biased toward one another by spring means 16 which causes ends 13 and 15 to engage plate 17. Shoes 12 and 14 include hold-down pins 12A and 14A. Brake 10 is a nonservo drum brake whose second pair of brake shoe ends 18 and 20 contain therebetween laterally movable sleeve housing 22. As illustrated in FIGS. 1 and 2, sleeve housing 22 includes a pair of oval shaped slots 24 which receive fixing connections or rivets 26 that position housing 22 for lateral movement relative to support plate 28. Laterally movable sleeve housing 22 includes longitudinal opening 27 which communicates with transverse through opening 29. Connection means or pin 30 extends through the housing at housing mount portion 23 which is adjacent the through opening 27, with pin 30 extending through complementary shaped openings in each side of mount portion 23 of housing 22. Connection means 30 includes head 32 and is attached to housing 22 by means clip ring 34. Mechanical actuator and adjuster mechanism 40 comprises star wheel adjuster or first part 42, second part or abutment member 48, and third part or pawl 60 disposed about housing 22. Referring to FIGS. 2 and 3, star wheel adjuster or second part 42 includes a threaded shoe abutment member 41 with a slot 47 receiving end 20 of brake shoe 14, and threads 43 which are received within threaded opening 45 of the shaft of star wheel 44. Star wheel 44 includes about an end opposite the star wheel a vinyl seal 46 which excludes contaminates from threads 43. In FIGS. 1 and 2, a thrust washer 71 is located between star wheel 44 and housing 22. Referring to FIGS. 2 and 4, second part 48 includes a head 11 which abuts end 18 of brake shoe 12, and oppositely disposed slot 49 which receives a portion of actuating lever 50 (see FIG. 1). Part 48 has an anti-friction sleeve 72 disposed between itself and housing 22 (see FIG. 2). Actuating lever 50 includes aperture 51 (FIG. 2) receiving connection means 30, an end aperture 53 for connection with a brake actuating cable or rod, and end portion 55 which extends through the transverse opening of housing 22 and terminates in end actuating arm 57 for engaging an actuator arm 65 of pawl 60. End portion 55 is received within slot 49 of second part 48. Connection means 30 mounts pivotably or rotatably both lever 50 and pawl 60 relative to slidable housing 22.

Figure 5:
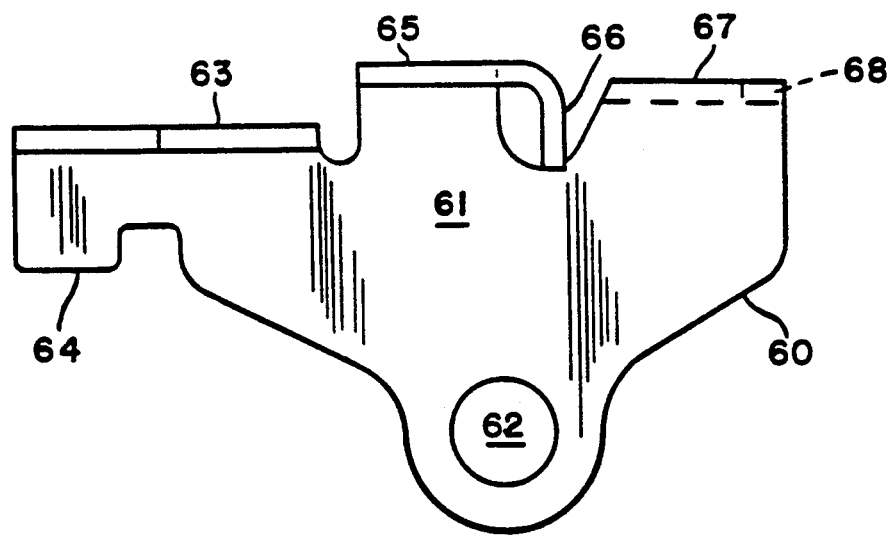
FIG. 5 is a plan view of the pawl utilized with the adjuster device.
Figure 7:
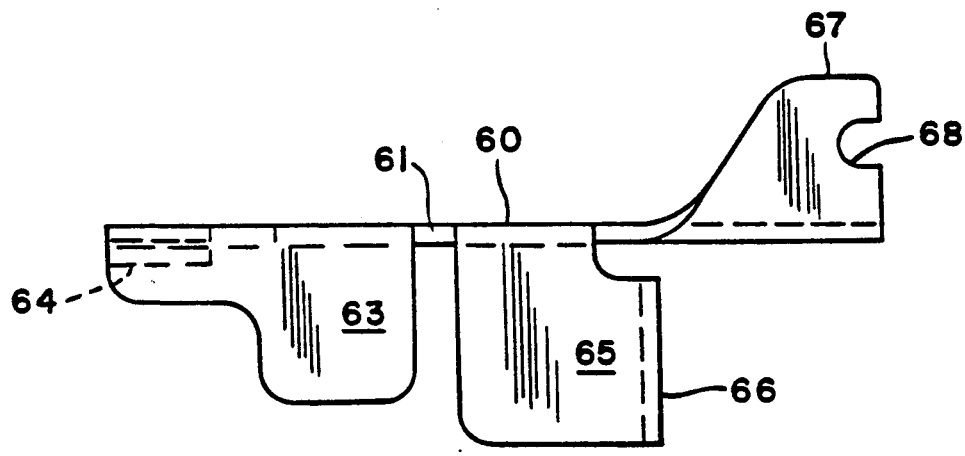
FIG. 7 is a top view taken along view line 7—7 of FIG. 5.
Figure 6:
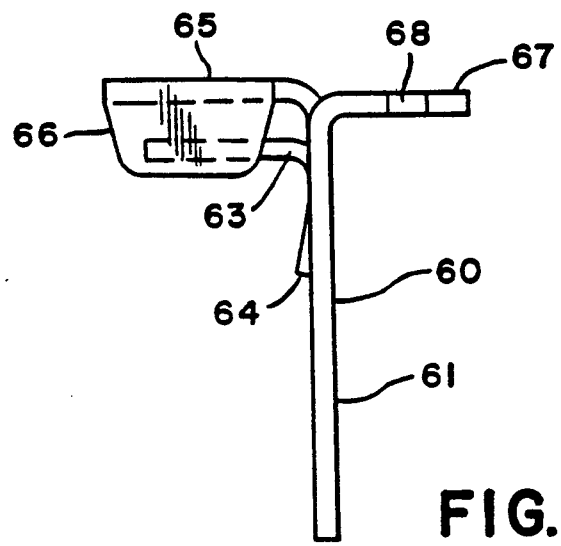
FIG. 6 is an end view taken along view line 6—6 of FIG. 5.

Referring now to FIGS. 5-7, pawl 60 comprises planar portion 61 having opening 62 which receives connection means 30 in order to mount rotatably pawl 60 on housing 22. Wave washer 33 (FIG. 1) is disposed between head 32 and pawl 60 in order to bias pawl 60 into contact with housing 22 and maintain proper positioning, while permitting pawl 60 to have a small degree of freedom about an axis transverse to the axis of pin 30 as engagement portion 64 of pawl 60 travels over the teeth of star wheel 44. Pawl 60 further includes a motion limiter arm 63 and actuator arm 65, arm 63 engaging housing 22 to limit the rotational motion of pawl 60 about pin 30 under the action of spring 70. Actuator arm 65 includes downwardly extending actuating arm 66 which is engaged by actuating arm 57 of lever 50. Each arm 63, 65 extends perpendicular to the planar portion 61 (FIG. 6). Limiter arm 63 includes star wheel engagement portion 64 which extends substantially axially relative to the brake and engages the teeth of star wheel 44. Pawl 60 further includes spring support flap 67 extending oppositely from arms 63 and 65, so as to be parallel therewith but disposed on an opposite side of planar portion 61. Spring support flap 67 includes notch 68 for receiving an end of spring 70. Spring 70 extends between pawl 60 and end 20 of brake shoe 14 to bias star wheel engagement portion 64 into engagement with the teeth of star wheel 44, and to return brake shoe 14 to the disengaged or idle position when the brake applying force at end aperture 53 is released.

Mechanically actuated brake 10 is operated by the vehicle operator pressing the brake pedal which causes a cable connected with lever 50 to retract and cause lever 50 to move in the general direction of arrow A in FIG. 2. Lever 50 rotates about connection means 30 so that end portion 55 forces second part 48 of mechanism 40 against shoe end 18 to cause the brake shoe 12 to move outwardly and engage the rotating drum 19 of brake 10. Because housing 22 is laterally movable, the rotation of lever 50 results in the movement of shoe 14 into contact with drum 19 as a result of reactive forces from lever 50 via pin 30 to sleeve housing 22, to thrust washer 71, to star wheel adjuster 42, and shoe end 20. If the linings of the brake shoes have worn to an extent that requires adjustment, the brake shoes will move a distance outwardly such that actuating arm 57 moves a distance greater than the operating distance J shown in FIG. 2 so that arm 57 engages actuating arm 66 of pawl 60. This causes pawl 60 to rotate against connection pin 30. Continued motion of lever 50 causes continued rotation of pawl 60 until engagement portion 64 of pawl 60 has moved to the next tooth of star wheel 44. Upon release of the brake supplying force, lever 50 returns in a direction generally opposite to arrow A of FIG. 2, and pawl 60 is caused by spring 70 to return toward its at rest position shown in FIGS. 1 and 2 wherein engagement portion 64 will cause star wheel 44 to rotate, which causes threaded shoe abutment member 41 to move outwardly and adjust brake shoe 14 toward drum 19 of brake 10. Because housing 22 is laterally movable, a reaction force against housing 22 will cause it to move slightly and cause shoe end 18 of shoe 12 to adjust outwardly toward the drum 19.

The mechanically actuated brake of the present invention provides an efficiently and reliably operating drum brake which utilizes component parts that provide more than one function. The brake will operate and adjust automatically whether the vehicle is proceeding in a forward or reverse direction. The automatic adjustment will also be accomplished without vehicle motion because the adjustment function is accomplished by a brake application action (i.e. depressing the brake pedal).

Figure 8:
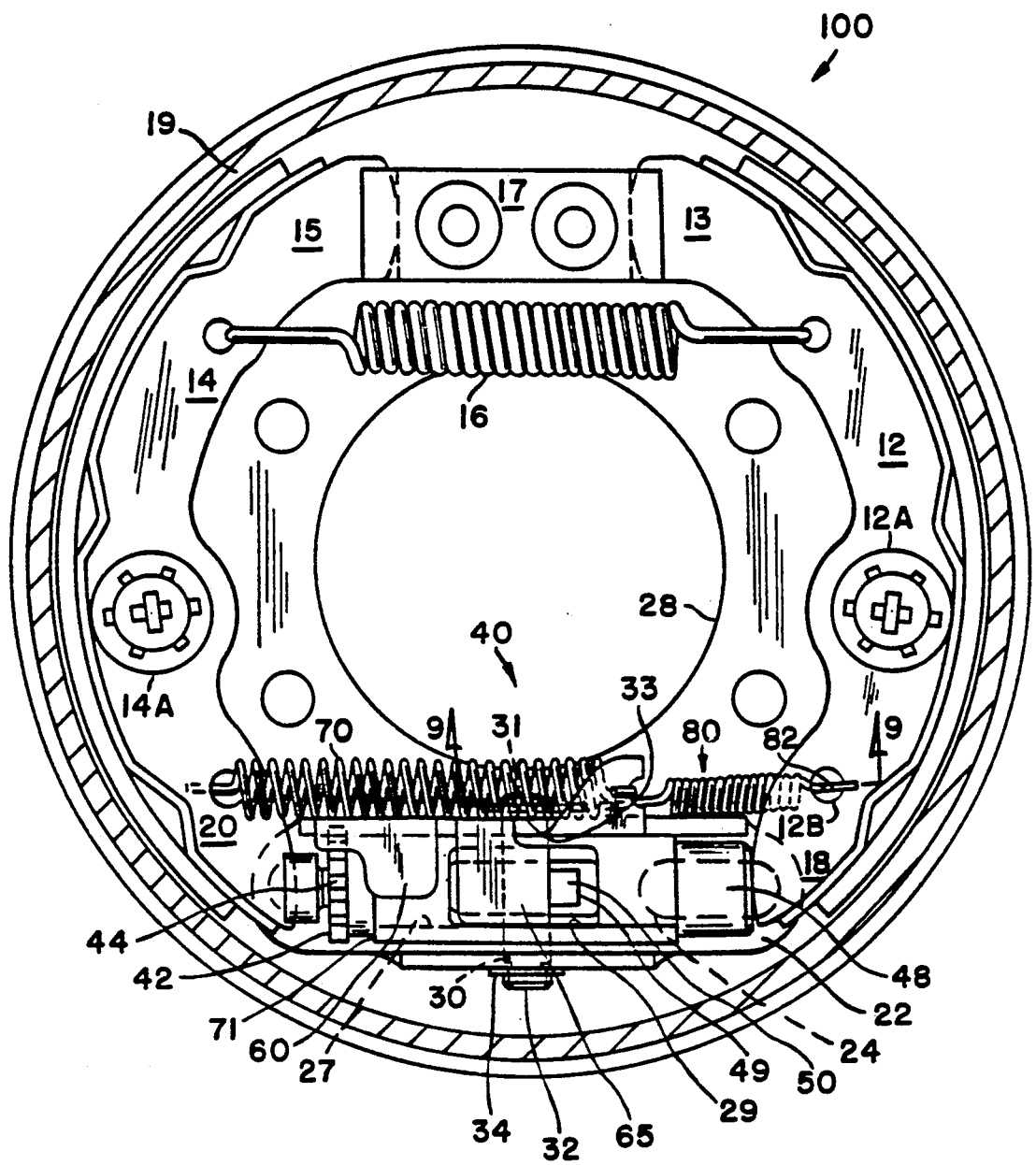
FIG. 8 is a plan view of the mechanically actuated brake with an improved return spring in accordance with the present invention.
Figure 9:
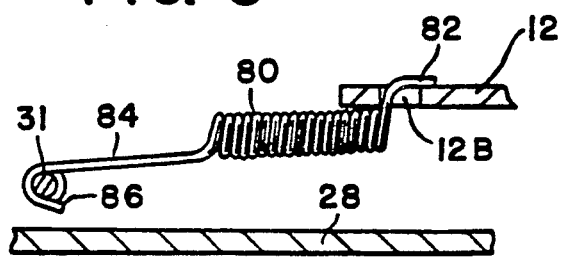
FIG. 9 is a view taken along view line 9—9 of FIG. 8.

FIG. 8 illustrates the mechanically actuated brake 100 which may also include an improved return spring device. Brake 100 is identical in almost all respects to brake 10 illustrated in FIG. 1 except that brake 100 also includes an improved return spring 80 extending between brake shoe 12 and connection means or pin 30. Pin 30 includes extension end 31 which receives spring hook 86 of arm 84 of return spring 80 (see FIG. 9). Arm 82 of spring 80 is received through opening 12B of brake shoe 12 in order to couple return spring 80 with shoe 12. Thus, return spring 80 effectively baises shoe 12 toward its engagement with abutment member 48 of mechanical actuator and adjustment mechanism 40. Return spring 80 provides shoe 12 with a return force which effectively reduces friction between threads 43 of abutment shoe member 41 and the threads of star wheel 44. As a result, the torque required for pawl 60 to rotate star wheel 44 is effectively reduced. Additionally, the engagement and biasing force of hook 86 of spring 80 against connection means or pin 30 and the associated actuating lever 50 effects a loading or biasing force upon the lever so that free rotation is inhibited. The result is that the actuating lever 50 has a more positive "feel" and remains in proper position during assembly of the brake and during attachment of the brake with the vehicle. An additional advantage provided by return spring 80 is that the loading or effective forces required of spring 70 are reduced. As a result of the reduction in the amount of torque required to turn star wheel 44, less force need be exerted by spring 70 against pawl 60 in order to effect rotation of star wheel 44. This permits the utilization of a smaller spring 70, and a more efficient operation of the mechanical actuator and adjuster mechanism 40. Because a smaller spring 70 may be utilized, stress problems typically attendant to high load springs are eliminated.

Mechanically actuated brake 100 with improved return spring 80 provides an efficient and reliably operating drum brake which minimizes the torque required to rotate star wheel 44 and also reduces the size and force effecting requirements of the springs associated with the actuator and adjuster mechanism 40.

I claim:

1. A mechanically actuated brake with automatic adjustment, comprising a support plate providing support for a pair of brake shoes disposed oppositely from one another, first and second pairs of brake shoe ends connected at the first pair of ends by spring means urging the first pair of brake shoe ends toward one another, a mechanical actuator and adjuster mechanism located between the second pair of brake shoe ends, the mechanism including an adjuster device comprising a laterally slidable housing having a longitudinal opening communicating with a transverse opening therethrough, an actuator lever extending to engage a part of the adjuster device by way of said transverse opening, the adjuster device having first, second and third parts, the first and second parts located within said longitudinal opening, the second part engaging said lever, abutting an end of said second pair of brake shoe ends, and slidably received in the longitudinal opening, the third part comprising a pawl engageable by the lever, means for connecting rotatably the lever and pawl with said housing, said pawl extending to engage said first part, a spring extending between and attached to said pawl and one brake shoe end of the second pair of brake shoe ends in order to actuate directly the adjuster device, and a second spring extending between and attached to the connecting means and the other brake shoe end of said second pair of brake shoe ends.

2. The mechanically actuated brake in accordance with claim 1, wherein said housing includes a pair of oval-shaped slots which receive connections with said support plate so that the housing may move laterally.

3. The mechanically actuated brake in accordance with claim 2, wherein said connecting means extends through said housing.

4. The mechanically actuated brake in accordance with claim 1, wherein the pawl includes a motion limiter arm which extends over said housing to limit rotational movement of the pawl relative to the housing, and the pawl further including an actuator arm which extends inwardly toward the transverse opening of the housing for engagement by said lever.

5. The mechanically actuated brake in accordance with claim 4, wherein the pawl comprises, in section view, a substantially planar portion extending into said limiter arm which extends orthogonally relative thereto, the actuator arm which extends orthogonally relative to the planar portion, and a spring support flap which extends oppositely from said limiter arm and actuator arm to be substantially parallel therewith.

6. The mechanically actuated brake in accordance with claim 5, wherein said pawl includes an opening in said planar portion for receiving said connecting means.

7. The mechanically actuated brake in accordance with claim 1, wherein said lever engages the second part which abuts an end of said second pair of brake shoe ends, so that rotates of the lever about the connecting means causes the brake shoes to move apart from one another.

8. The mechanically actuated brake in accordance with claim 7, wherein the second part includes a slot for receiving said lever.

9. The mechanically actuated brake in accordance with claim 1, wherein the first part comprises a star wheel having a shaft with a threaded opening, and a threaded shoe abutment received within the threaded opening.

10. The mechanically actuated brake in accordance with claim 9, wherein the threaded shoe abutment member engages said one brake shoe end of said second pair of brake shoe ends, and the shaft of the star wheel includes a seal member thereabout so that said star wheel rotates easily within said longitudinal opening of the housing.

* * * * *